United States Patent [19]

Bernhardt

[11] 4,320,653
[45] Mar. 23, 1982

[54] METHOD OF AND APPARATUS FOR MEASURING THE RATE OF LEAK

[75] Inventor: Karl-Heinz Bernhardt, Braunfels, Fed. Rep. of Germany

[73] Assignee: Arthur Pfeiffer-Vakuumtechnik Wetzlar GmbH, Asslar, Fed. Rep. of Germany

[21] Appl. No.: 166,797

[22] Filed: Jul. 8, 1980

[30] Foreign Application Priority Data

Jul. 13, 1979 [DE] Fed. Rep. of Germany ....... 2928336

[51] Int. Cl.³ ............................................. G01M 3/32
[52] U.S. Cl. ......................................................... 73/40
[58] Field of Search ................................... 73/49.2, 40

[56] References Cited

U.S. PATENT DOCUMENTS 3,028,750  4/1962  Rondeau ............................... 73/49.2
3,691,821  9/1972  Davey .................................. 73/49.2
3,818,752  6/1974  Lindeberg ............................ 73/49.2
4,172,477  10/1979  Reich .............................. 73/49.2 X

FOREIGN PATENT DOCUMENTS 501322  4/1976  U.S.S.R. ............................... 73/49.2

Primary Examiner—Kyle L. Howell
Assistant Examiner—Joseph W. Roskos
Attorney, Agent, or Firm—Toren, McGeady & Stanger

[57] ABSTRACT

In measuring the rate of leak from a test object, a conduit system including branch lines interconnects the test object with a measuring tank, a pressure gauge, a vacuum pump and a device for removing vapor from the measuring tank. Valves in the conduit system permit the various parts to be selectively interconnected or separated. By measuring the pressure in the measuring tank under various conditions it is possible to determine the rate of leak.

10 Claims, 1 Drawing Figure

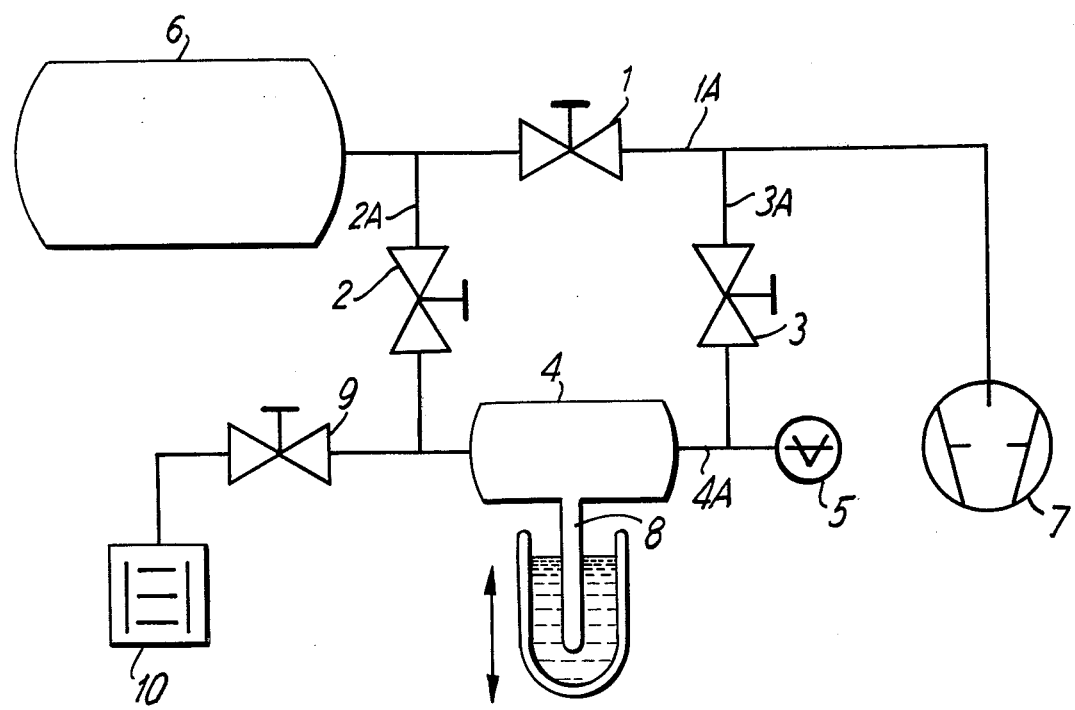

METHOD OF AND APPARATUS FOR MEASURING THE RATE OF LEAK

SUMMARY OF THE INVENTION

The invention relates to measuring the rate of leak according to the pressure rise method in tanks in which liquids and/or their vapors are air present.

Measuring the rate of leak according to the pressure rise method is old and well known and is frequently used in determining the integral rate of leak, particularly in vacuum tanks. The method is simple and, when used correctly, provides quite accurate results. The test object is evacuated and then closed. The pressure is measured and, after a period of time, the pressure is measured again. It is then possible to compute, from the volume of test object, the pressure rise and the elapsed time, the rate of leak in mbar.1/sec.

This method, however, is inaccurate when liquid and/or vapor are present in the test object. To achieve correct results in measuring the pressure, the partial pressures of the vapors must be eliminated by providing a cool trap between the test object and the pressure gauge. Such an arrangement causes a strong flow of vapor out of the test object and the vapor flow entrains diffused gas which accumulates at the pressure gauge. As a result, a higher gas pressure is measured than the actual pressure prevailing in the test object. Moreover, temperature variations in the test object lead to significant changes in the partial vapor pressures.

Therefore, the primary object of the present invention is to avoid the disadvantages experienced in the past by providing an arrangement in which the elimination of the partial vapor pressures in the system facilitate the accurate measurement of the partial pressure.

In accordance with the present invention a method of and apparatus for measuring the rate of leak is provided in which a test object is interconnected with a measuring tank via a conduit system including branch lines which can be closed off by valves. The conduit system includes a vacuum pump, a measuring gauge, and a device for removing vapor from the measuring tank.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

The drawing is a schematic illustration of an apparatus embodying the present invention.

DETAIL DESCRIPTION OF THE INVENTION

In the drawing a conduit system includes a line 1A containing a valve 1. One end of the line 1A is connected to a test object 6 having a volume $V_1$ and its other end is connected to a vacuum pump 7. A pair of branch lines 2A and 3A extend from the line 1A each on an opposite side of the valve 1. The conduit system includes another line 4A containing a measuring tank 4 having a volume $V_2$. Branch line 2A is connected to line 4A on one side of the measuring tank 4 while the other branch line 3A is connected to the line 4A on the other side of the measuring tank 4. Branch line 2A contains a valve 2 and branch line 3A contains a valve 3. By opening or closing the valves selective interconnection can be provided between the various components connected into the conduit system. A cooling device 8 is connected to the measuring tank 4 and a pressure gauge 5 is located at one end of the line 4A in communication with the measuring tank. The volume of the cooling device 8 is small compared to the volume of the measuring tank to keep the pressure variations or differences caused by low temperatures at a low level. In place of the cooling device, an absorption trap 10 is connected into the line 4A on the opposite side of the measuring tank 4 from the measuring gauge 5. A valve 9 is located in the line 4A between the measuring tank 4 and the absorption trap 10 and affords the selective interconnection of the trap with the measuring tank.

When the cooling device 8 is used for the reduction of the partial pressure within the measuring tank, initially, the rate of leak is determined by evacuating the entire system by means of the conduit pump 7 with each of the valves 1, 2 and 3 open. After evacuation is effected, valves 1 and 3 are closed. With valve 2 open, an equalization of pressure is reached between the test object 6 and the measuring tank 4. At the point of time $t_1$, the valve 2 is closed isolating the measuring tank from the test object. Subsequently, the cooling device 8 connected to the measuring tank 4 is cooled from the outside by a cooling agent until all the vapors within the measuring tank 4 are condensed and the measuring gauge 5 indicates as the minimum pressure $P_1$ only the pressure of the gases which are not condensed at the temperature of the cooling agent, that is, essentially only the partial air pressure. Following this measurement, the cooling device is returned to ambient temperature. Valve 3 is opened and the vacuum pump 7 is operated so that the measuring tank 4 and the measuring gauge 5 are evacuated to the final pressure $P_e$ of the vacuum pump 7. Next, valve 3 is closed separating the measuring tank 4 from the vacuum pump and the valve 2 is opened interconnecting the measuring tank with the test object 6. Again equalization of pressure between the tank and the object is effected and at the point of time $t_2$ the valve 2 is closed. The cooling device is again cooled and the minimum pressure $P_2$ is recorded on the measuring gauge 5.

As indicated above, the cooling device 8 and the absorption trap 10 are alternative devices for effecting the reduction of partial pressure in the measuring tank 4. Only one of these devices would be needed. If the reduction of partial pressure is achieved by using the absorption trap 10, the method of measuring the rate of leak proceeds as follows:

Initially, measuring tank 4, measuring gauge 5 and absorption trap 10 are evacuated to the final pressure $P_e$ by means of the vacuum pump with the valves 1 and 2 closed and valves 3 and 9 open. Next, valves 3 and 9 are closed and valve 2 is opened interconnecting the test object 6 with the measuring tank 4. When pressure equalization is attained between the test object 6 and the measuring tank 4, the valve 2 is closed at the point of time period $t_1$. At this point, the valve 9 is opened affording communication between the measuring tank 4 and the absorption trap 10. Vapors present in the measuring tank are now absorbed in the absorption trap. Measuring gauge 5 reads the minimum pressure $P_1$ only for the pressure of the gases which are not absorbed, that is, essentially only for the partial air pressure. Following this measurement, the valve 3 is opened and the measuring tank 4, the measuring gauge 5 and the absorption trap 10 are evacuated to the final pressure $P_e$ by the vacuum pump 7. Again the valves 3 and 9 are closed and the valve 2 is opened connecting the measuring tank 4 to the test object 6. After equalization of pressure has been accomplished between the tank and the test object, valve 2 is closed at the point of time $t_2$. Subsequently, valve 9 is opened connecting the absorption trap 10 to the measuring tank 4. Again, any vapor is absorbed and the minimum pressure $P_2$ within the measuring tank 4 can be read on the vacuum or measuring gauge 5.

According to both methods (reduction of the partial vapor pressures by cooling components of the measuring tank or by means of an absorption trap), the rate of leak is computed by the following formula:

$$Q = \frac{P2 \cdot (V1 + V2) - P1 \cdot V1 - Pe \cdot V2}{t2 - t1}$$

wherein,
$Q$ = rate of leak
$P_1$ = pressure at time $t_1$
$P_2$ = pressure at time $t_2$
$P_e$ = final pressure in the measuring system
$V_1$ = volume of the test object
$V_2$ = volume of the measuring tank
$t_2 - t_1$ = time interval If the volume $V_2$ of the measuring tank 4 is small relative to the volume $V_1$ of the test object 6, the formula becomes simpler as follows:

$$Q = \frac{(P2 - P1) \cdot V1}{t2 - t1}$$

While specific embodiments of the invention have been shown and described in detail to illustrate the application of the inventive principles, it will be understood that the invention will be embodied otherwise without departing from such principles.

What is claimed is:

1. Method of measuring the rate of leak in a test object subjected to the establishment of vacuum conditions and in which test object liquids and/or their vapors are present, using the pressurized method and measuring the absolute pressure, wherein the improvement comprises connecting a measuring tank to the test object and valving the connection for selectively interconnecting the measuring tank and the test object, evacuating the test object and measuring tank, providing the measuring tank and test object in intercommunication for equalizing the pressure therebetween and closing off the interconnection therebetween after a time, removing the vapors within the measuring tank for reducing the partial pressure therein, measuring the pressure of the gases in the measuring tank, providing intercommunication between the vacuum pump and the measuring tank and evacuating the test object and the measuring tank to a final pressure, closing off the vacuum pump and the measuring tank while affording intercommunication between the test object and the measuring tank for effecting pressure equalization therebetween, closing off the intercommunication between the test object and the measuring tank, removing the vapor contents of the measuring tank for reducing the partial pressure therein, measuring the pressure in the measuring tank and based on the measured pressures and the time difference determining the rate of leak.

2. Method, as set forth in claim 1, wherein in removing the vapors from the measuring tank the partial pressure of the vapor in the measuring tank are reduced so that the relative difference to the final pressure attainable by a vacuum pump is small.

3. Method, as set forth in claim 1, evacuating the test object and the measuring tank by using a vacuum pump.

4. Method, as set forth in claim 1, including removing the vapor for reducing the partial pressure by cooling parts of the contents of the measuring tank.

5. Method, as set forth in claim 1, including removing the vapor for reducing the partial pressure by absorbing the vapor from the measuring tank.

6. Method, as set forth in claim 4, including returning the measuring tank to ambient temperature prior to evacuating and the measuring tank to the final pressure.

7. Method, as set forth in claim 1, including removing the vapors from within the measuring tank so that the vapors removed do not contact the device for measuring the pressure in the measuring tank.

8. Apparatus for measuring the rate of leak in a test object comprising a test object, a vacuum pump, a first conduit connecting said vacuum pump to said test object, a first valve located in said first conduit between said test object and said vacuum pump so that communication between said test object and vacuum pump can be selectively effected, a pressure gauge, a second conduit spaced from said first conduit and connected to said pressure gauge, a measuring tank located in said second conduit spaced from said pressure gauge, a first branch line connected at one end to said first conduit between said test object and said first valve and at the other end to said second conduit on the opposite side of said measuring tank from said measuring gauge, a second branch line connected at one end to said first conduit between said first valve and said vacuum pump and at the other end to said second conduit between said measuring tank and said measuring gauge, and means connected to said measuring tank for removing vapor therefrom so that the removed vapors do not contact said measuring gauge.

9. Apparatus, as set forth in claim 8, wherein said means comprise a cooling device connected to said measuring tank spaced from the connection between said measuring tank and said measuring gauge.

10. Apparatus, as set forth in claim 8, wherein said means comprise an absorption trap located in said second conduit on the opposite side of said measuring tank from said measuring gauge and a fourth valve located in said second conduit between said absorption trap and the connection of said first branch line to said second conduit for selectively interconnecting said absorption trap and said measuring tank.

* * * * *